United States Patent
Lokhorst et al.

(10) Patent No.: US 6,715,359 B2
(45) Date of Patent: Apr. 6, 2004

(54) PRESSURE SENSITIVE SURFACES

(75) Inventors: David M. Lokhorst, Victoria (CA); Sathya R. Alexander, Delta (CA)

(73) Assignee: Tactex Controls Inc., Victoria (CA)

( * ) Notice: Subject to any disclaimer, the term of this patent is extended or adjusted under 35 U.S.C. 154(b) by 45 days.

(21) Appl. No.: 10/184,080

(22) Filed: Jun. 28, 2002

(65) Prior Publication Data

US 2003/0079549 A1 May 1, 2003

Related U.S. Application Data

(60) Provisional application No. 60/301,238, filed on Jun. 28, 2001.

(51) Int. Cl.[7] .................................................. G01L 9/00
(52) U.S. Cl. .............................. 73/745; 73/700; 73/718; 73/724
(58) Field of Search .......................... 73/718, 700, 724, 73/714, 745

(56) References Cited

U.S. PATENT DOCUMENTS

| | | | | | |
|---|---|---|---|---|---|
| 4,296,406 | A | * | 10/1981 | Pearson | 341/34 |
| 5,241,308 | A | * | 8/1993 | Young | 341/34 |
| 6,032,536 | A | * | 3/2000 | Peeters et al. | 73/725 |
| 2003/0094047 | A1 | * | 5/2003 | Torkkeli | 73/716 |

* cited by examiner

Primary Examiner—Edward Lefkowitz
Assistant Examiner—Jermaine Jenkins
(74) Attorney, Agent, or Firm—Oyen Wiggs Green & Mutala

(57) ABSTRACT

A position sensor comprises a substrate having an array of pressure sensors and a membrane overlying the substrate. The membrane includes physical parameters which vary with position. The membrane may include discontinuous regions and protrusions which affect the way in which forces on the membrane are distributed to the substrate. A pressure sensor may also include a controller for receiving pressure information from the substrate, with a signal processor being programmed to localize the depressed region or regions of the substrate.

17 Claims, 7 Drawing Sheets

PRESSURE SENSITIVE SURFACES

CROSS-REFERENCE TO RELATED APPLICATION

This application claims the benefit of the filing date of U.S. application No. 60/301,238 filed on Jun. 28, 2001 and entitled MEMBRANE FOR COVERING A PRESSURE SENSITIVE SURFACE.

TECHNICAL FIELD

This invention relates to pressure-sensitive devices. More particularly, the invention concerns structures for accurately localizing point sources of pressure and methods for determining the location and force of a point pressure source on a pressure-sensing surface. The invention may be applied to provide interfaces to electronic devices.

BACKGROUND

It is known to make pressure-sensitive surfaces by instrumenting a mat or other structure which includes a surface region with an array of pressure sensing elements. For example, an array of pressure sensors of the type described in PCT publication No. WO 99/04234 (Reimer, et al.), can be used to detect the location and pressure applied by several simultaneous points of contact.

The surface may be covered with a membrane as described, for example, in WO 00/73982 (Inkster). Such membranes can cause problems, however. A membrane can distribute pressure so that touching at one location causes signals from the pressure sensors in a surrounding area. The prior pressure-sensitive surfaces described above provide no way to isolate the response of a set of pressure sensors from neighboring ones.

In conventional pressure-sensitive structures which include a membrane overlying an array of pressure sensors, the membrane distributes pressure imposed by an indentor radially outwardly from the indentor in a generally uniform manner. The inventors have determined that by selecting the properties of a membrane, it is possible to control how force from an indentor will be distributed over pressure sensors in a pressure-sensitive structure. This can be very beneficial in some applications.

SUMMARY OF THE INVENTION

In general, the invention relates to position sensing surfaces wherein individual sensing elements located on a substrate measure pressure at specific locations. In many cases it is desirable to know the location of the applied pressure, which may not be directly over one of the sensing elements. In such applications, a membrane positioned adjacent the substrate can distribute the pressure over several nearby pressure sensing elements, which enables one to compute the pressure at any point by interpolating between sensors. This also provides a means to reduce the total number of sensing elements for a resulting reduction in costs and complexity.

The sensitivity of the device may be improved by the use of protrusions on the membrane, each of which is located so as to contact an individual sensing element. As can be imagined, when a membrane is constructed in this manner, any force applied to the membrane is transferred to the individual sensing elements by the protrusions. Since the total contact area of the protrusions is small, the bearing pressure is concentrated at those protrusions.

If an "indentor" is used to apply a force to the surface, the location of the indentor may be estimated by means of a centre-of-mass algorithm or other similar mathematical computation. The invention provides to an improved method to accurately compute the indentor location.

The invention further relates to a position sensor comprising a substrate covered by a membrane. The substrate comprises an array of pressure detecting means. The pressure detecting means may comprise any of a number of systems, including force sensitive resistors, piezo-electric crystals, strain gauge-based sensors, and optical pressure sensors of the type described in WO 99/04234, among others. The type of pressure detecting means may be varied without departing from the invention. One aspect of the invention relates to the use of physical features in the membrane (such as holes or recesses) to tailor the distribution of pressure. Another aspect of this invention relates to position sensors having irregular distributions of pressure sensing elements. Another aspect of this invention provides a way to accurately compute the location of an "indentor" which is applying pressure.

In one aspect, the invention comprises a position sensor, comprising a substrate covered by a membrane. The substrate includes an array of individual pressure-detecting elements. The membrane has a non-uniform structure and comprises means for isolating areas of depression of the membrane caused by local application of pressure wherein depression of a first of said areas causes substantially no depression of a second, adjacent area.

The means for isolating the membrane areas may comprise a slot between the first and second areas. Alternatively, the isolating means may comprise an area in which the membrane is fixed to the substrate. The membrane may be fixed to the substrate in a trough, or depressed portion between the areas. The portions of the membrane adjacent to the trough are not fixedly engaged to the substrate.

In one embodiment, the membrane comprises at least one depressed region for contacting the substrate. The membrane is separated from the substrate other than at the location at the at least one depressed region.

The isolated membrane areas have various shapes and may be arranged in regular or irregular arrays. The areas may be one or more of a rectangular, triangular, truncated triangular or irregular-shaped.

In another aspect, the membrane is partly separated from the substrate, being supported on the substrate by one or more regions of the membrane which contact the substrate. Pressure applied to the membrane is thus transmitted to the substrate solely or substantially at the contact regions.

In another aspect, the invention comprises a pressure sensing surface comprising a substrate having an array of pressure sensing means and signal processing means to receive pressure information from said sensing means. The signal processor means is programmed to calculate the location and magnitude of force applied to the membrane according to a formulae described herein, in which the sensor is assumed to be generally planar with x, y coordinates describing its surface.

This specification includes directional references such as "up" and "down" for convenience and ease of understanding. It will be understood that the sensors described herein may be placed in any orientation. The directional references herein are not intended to be limit the invention.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

A first aspect of the invention relates to constructions for pressure-sensitive devices. Anything which applies a downward force on the surface of such a device is referred to herein as an "indentor". In most applications it is of interest to be able to determine the location and magnitude of force applied to a pressure-sensitive device by one or more indentors.

Figure 1:
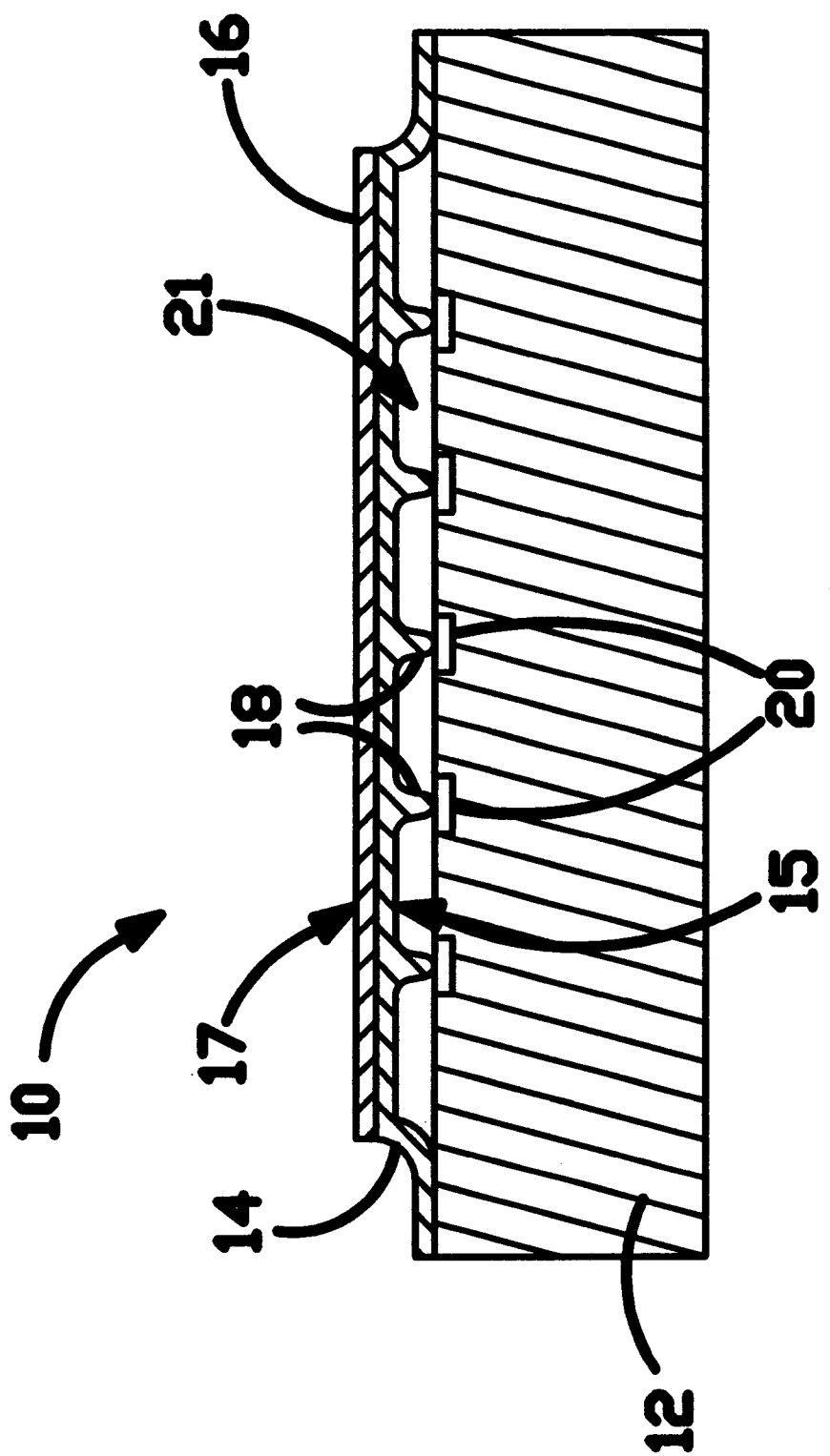
FIG. 1 is a sectional profile view of a membrane system according to one embodiment of the invention.

FIG. 1 shows a membrane system 10 according to a first embodiment of the invention. Membrane system 10 comprises a substrate 12, an overlying flexible membrane 14 and a number of pressure sensors 20 which are located to detect forces applied by one or more indentors to membrane 14.

Membrane 14 may be fabricated from a broad selection of materials and may be fabricated by a variety of processes. Membrane 14 is preferably flexible and elastic. The flexibility and modulus of elasticity of membrane 14 are determined by the material(s) from which membrane 14 is made, the manufacturing processes used to make membrane 14, the thickness of membrane 14, and the shape of membrane 14. These parameters are referred to as "physical parameters" of membrane 14.

Membrane 14 may comprise a wear surface 16. Wear surface 16 may comprise one or more layers of material. Membrane 14 may serve several purposes—it provides a durable wear surface, it protects pressure sensors 20 from the environment and it can distribute applied pressures over multiple sensors 20. Membrane 14 may be constructed so that it concentrates applied forces over individual pressure sensors 20, thereby increasing the sensitivity of system 10.

Wear surface 16 may provide an appropriate aesthetic or tactile nature. Wear surface 16 may comprise one or multiple layers. The one or more layers may each comprise any of a wide variety of materials, including polyurethane, polyester, polycarbonate, rubber, fabric, leather, and almost any other flexible material. In some cases, graphics may be printed on layers of wear surface 16 or membrane 14. The layers of wear surface 16 may be thick or thin, or of varying thickness. In some embodiments membrane 14 may include or overlie a layer of a compressible material between wear surface 16 and substrate 12.

There are a plurality of pressure sensors 20 on substrate 12. Pressure sensors 20 may comprise individual pressure sensors, or, may comprise a distributed presure sensor such as the cellular-type pressure sensor described in WO 00/73982. A pressure sensing arrangement of this type comprises a pad made of a compressible medium such as, cellular foam, which is semi-transparent or translucent to light. Compression of the medium alters the intensity of light detected by light sensors in an array of optical sensors. A signal processing unit translates the resulting signal into a determination of the location of force applied to the pressure sensing surface. The optical components and signal processing unit are not shown herein, but are fully described in WO 00/73982, which is incorporated herein by reference.

The specific type of pressure sensor 20 is not an essential aspect of the invention. Pressure sensors 20 may comprise sensors which measure deflection, forces or pressure. Pressure sensors 20 may comprise force-sensitive resistor elements. A sensor which can be used to sense forces applied to membrane 14 is referred to herein as a "pressure sensor", whatever the fundamental nature or mode of operation of the sensor may be. Pressure sensors 20 may be arranged in a regular array, such as a rectangular array or a hexagonal or triangular array. In some embodiments, pressure sensors 20 may be irregularly distributed on substrate 12.

The physical properties of membrane 14 may be selected and made to vary across membrane 14 in ways which alter the manner in which forces applied by indentors pressing on the upper surface 17 of membrane 14 are transmitted to sensors 20.

In the embodiment of FIG. 1, membrane 14 is substantially flat and has protrusions 18 formed on its underside 15 (the side adjacent substrate 12). Protrusions 18 are positioned to overlie individual pressure sensors 20. Protrusions 18 contact pressure sensors 20. Elsewhere there is a space 21 between substrate 12 and underside 15 of membrane 14. Protrusions 18 may optionally be adhered to pressure sensors 20.

Forces applied to the upper surface of membrane 14 are distributed to pressure sensors 20 by way of protrusions 18. Protrusions 18 concentrate downward forces applied to surface 16 over a subset of pressure sensors 20. This increases the sensitivity of system 10 and, by distributing the pressure over a number of pressure sensors 20, it facilitates accurate determination of the locations of applied forces.

Protrusions 18 may have various configurations. Protrusions 18 may include bumps which may be circular or other shaped, or straight or curved ridges. Protrusions may also be provided on top surface 17 of membrane 14. The protrusions typically increase the stiffness of membrane 14. Membrane 14 may also, or in the alternative, comprise areas of weakness. Areas of weakness may be provided by cuts or holes in the membrane, recessed regions, regions in which the membrane is made of a different material or composition, or regions in which one or more layers of the membrane are not present, are of different thickness, etc. The thickness of membrane 14 may vary over its area.

Figure 2:
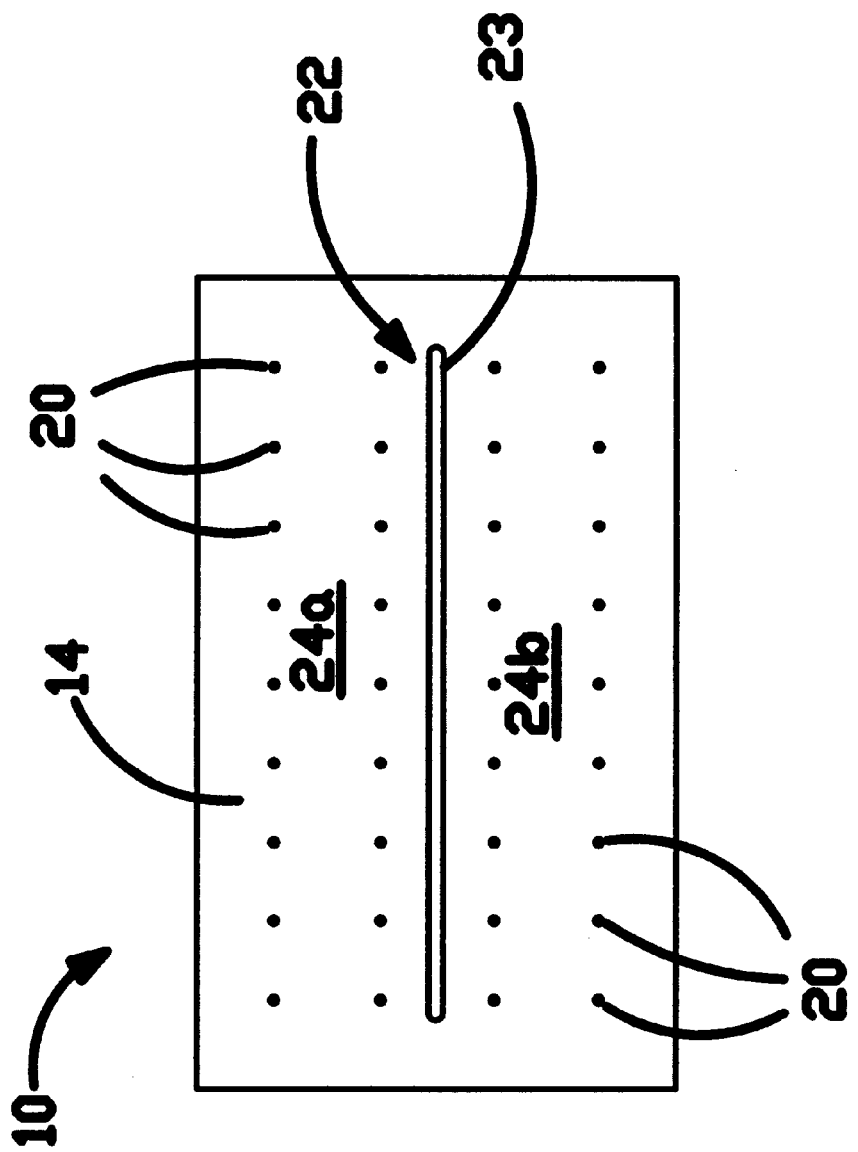
FIG. 2 is a plan view of a membrane system according to another embodiment of the invention.

In some applications, it is desirable to provide a membrane system divided into two or more separate areas, each of which can independently measure the location(s) and force(s) applied to the area by one or more indentors. FIG. 2 illustrates a membrane system 10, comprising substrate 12 overlain by membrane 14. Membrane 14 is divided into two areas 24a and 24b by a divider 22. In the FIG. 2 embodiment, divider 22 comprises a slot 23. Because membrane 14 is interrupted by slot 23, it does not distribute applied force from one area 24 to the other. Due to the discontinuity in membrane 14, indentors applying force in area 24a have no effect on the pressure signals generated by sensors 20 associated with area 24b, and vice versa. A membrane system 10 according to the invention may be divided into a plurality of separate areas of desired sizes and shapes by providing suitable dividers 22.

Dividers 22 may be formed by one or more of slots or other weakened regions within membrane 14 and regions of membrane 14 which contact substrate 12. Regions which contact substrate 12 may be trough-like in shape to isolate separate regions on either side of the trough. In the alternative, in these regions, membrane 14 may have bumps, ridges, or other protrusions which contact substrate 12.

Figure 3:
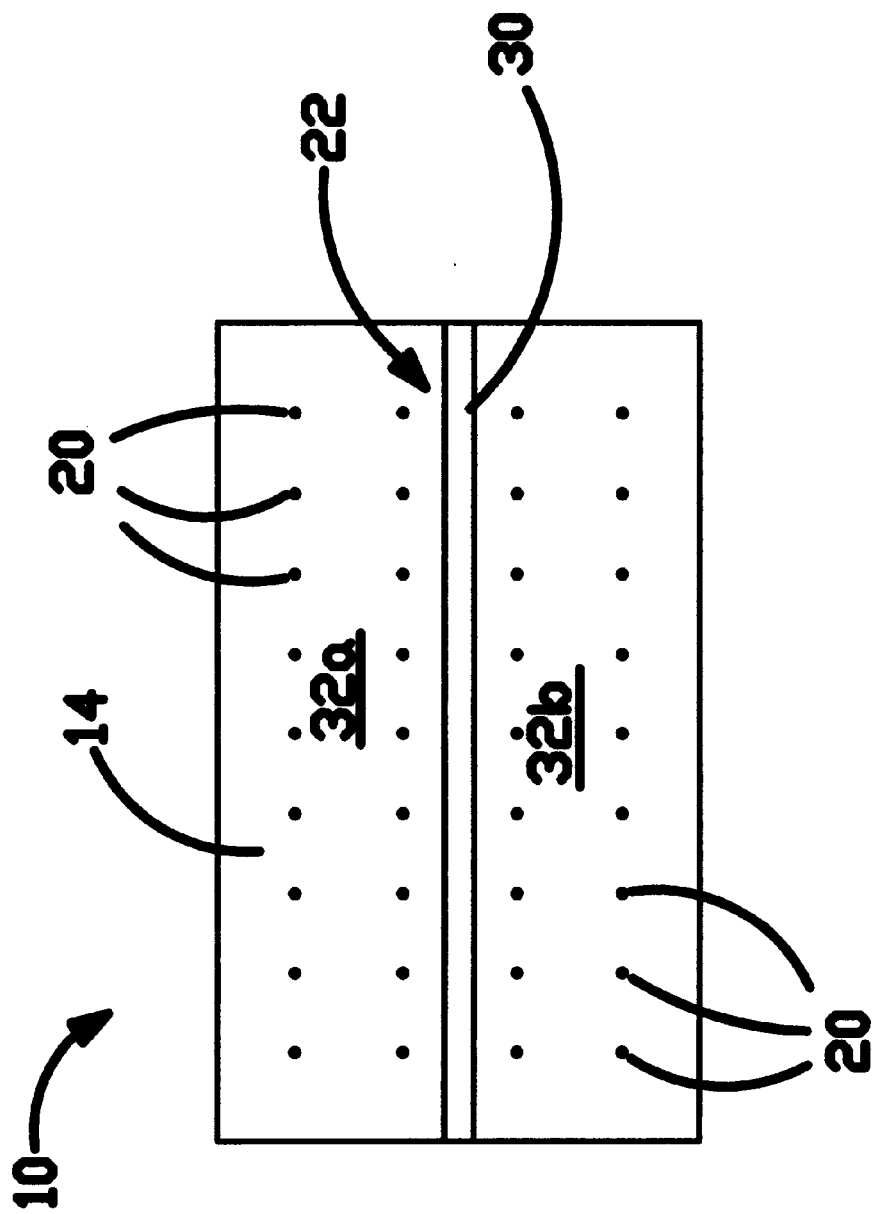
FIG. 3 is a plan view of a membrane system according to a further embodiment of the invention.
Figure 4:
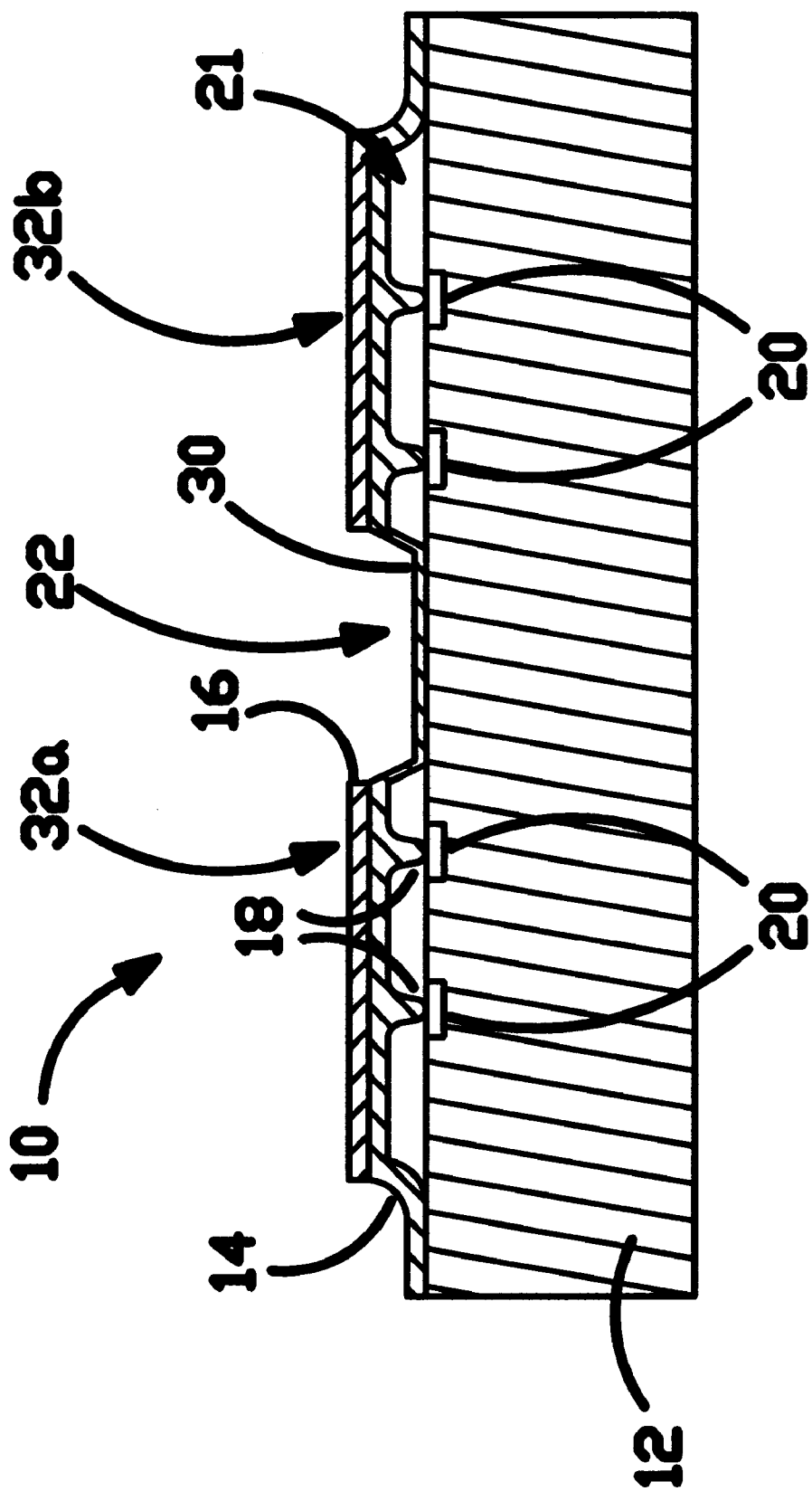
FIG. 4 is a sectional profile view through the membrane system of FIG. 3.

FIGS. 3 and 4 illustrate a further embodiment in which membrane 14 is divided into separate areas. In this embodiment, divider 22 comprises a region 30. In region 30 membrane 14 is adhered to substrate 12. Region 30 divides membrane 14 into two areas. Firmly affixing membrane 14 to substrate 12 between areas 32a and 32b prevents vertical forces from being transmitted from one area to an adjacent area. This isolates the areas. Divider 22 also affects the distribution of forces among pressure sensors 20 associated with areas 32. Where divider 22 comprises recessed region 30, recessed region 30 supports some applied load, and effectively stiffens membrane 14 near edges of areas 32a and 32b. In certain applications this can be used to advantage.

Dividers 22 may be designed in an application-specific manner. For example, consider an application wherein a touch surface is to be divided into two separate areas along its length (see FIG. 3) by recessed regions 30. In this example, touching within area 32a will not affect sensors in the adjacent area 32b. By constructing membrane 14 with recessed regions 30 (which are firmly fixed to substrate 12) along the long edges of areas 32a and 32b, membrane 14 is made to be more rigid. This provides an additional effect: the distribution of forces along the length of each area 32 (i.e. within each area 32) is diminished. As a result, pressure sensors 20 within each area 32 are also de-coupled (to some extent), even though there is not a physical feature dividing pressure sensors 20 within either area 32.

Consider another application where a touch surface is to be divided along its length by slot 23 as in FIG. 2. Like areas 32a and 32b, areas 24a and 24b, separated by slot 23, are isolated in that force applied to one area has no effect on the other area. However, each area 24a and 24b provides a continuous sensory surface. Several pressure sensors 20 respond to force applied on an indentor placed anywhere in either area.

The pressure distribution of membrane 14 can be tailored for specific applications. A combination of physical features (holes, slots, recessed regions, protrusions, bumps, ridges, varying thickness, etc.) may be used to achieve a variety of performance characteristics. One can think of these physical features as a set of tools to be used to create the desired performance characteristics.

In some cases, a regular, rectangular arrangement of pressure sensors 20 is preferred. In other applications, however, pressure sensors 20 may be arranged irregularly. The distribution of force by an indentor applied to pressure sensors 20 is determined by the physical parameters of membrane 14 (as described above). In combination with careful design of the physical parameters, the number of pressure sensors 20 may be minimized while still achieving a desired performance.

Figure 5:
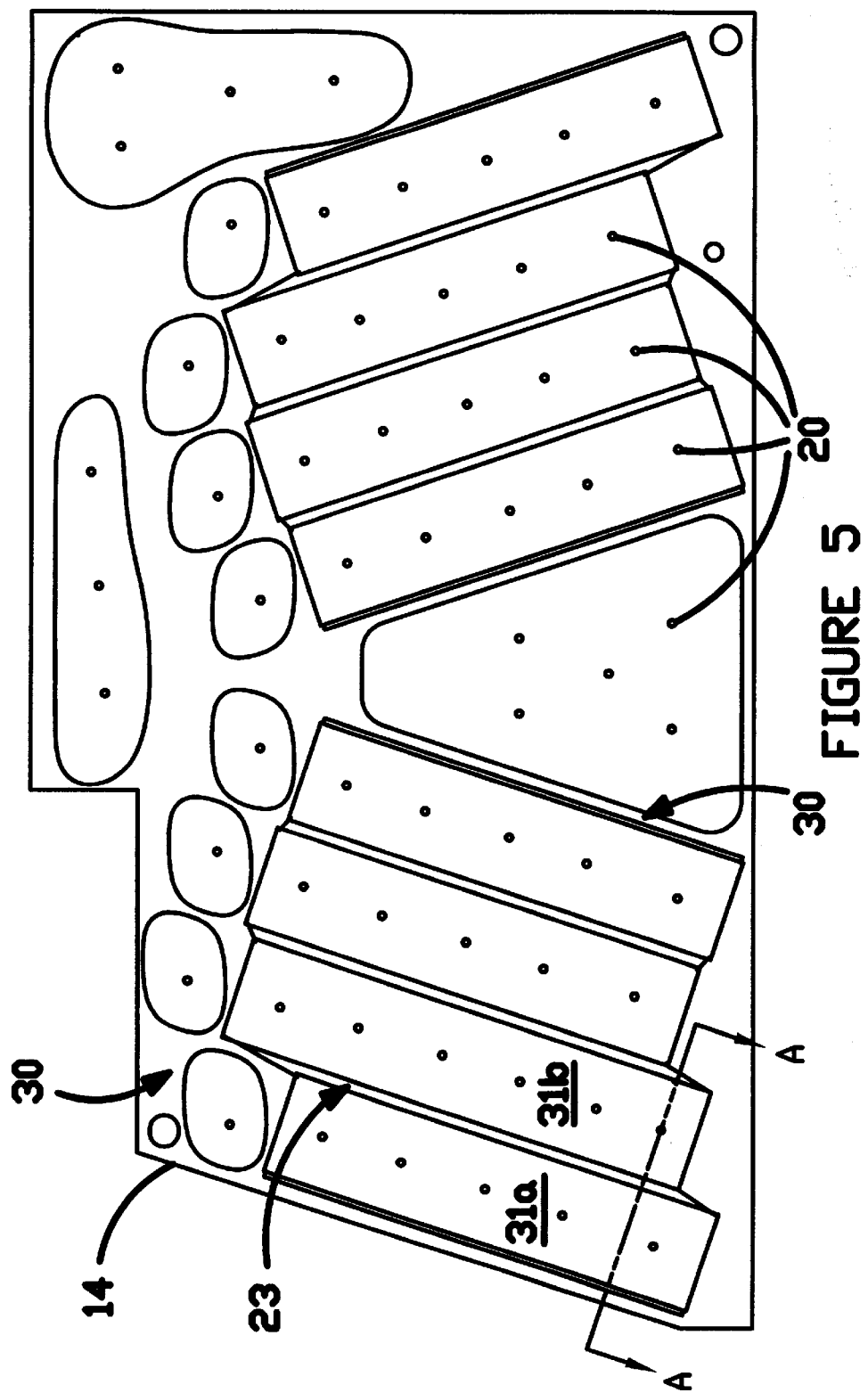
FIG. 5 is a plan view of a membrane system according to another embodiment of the invention.
Figure 6:
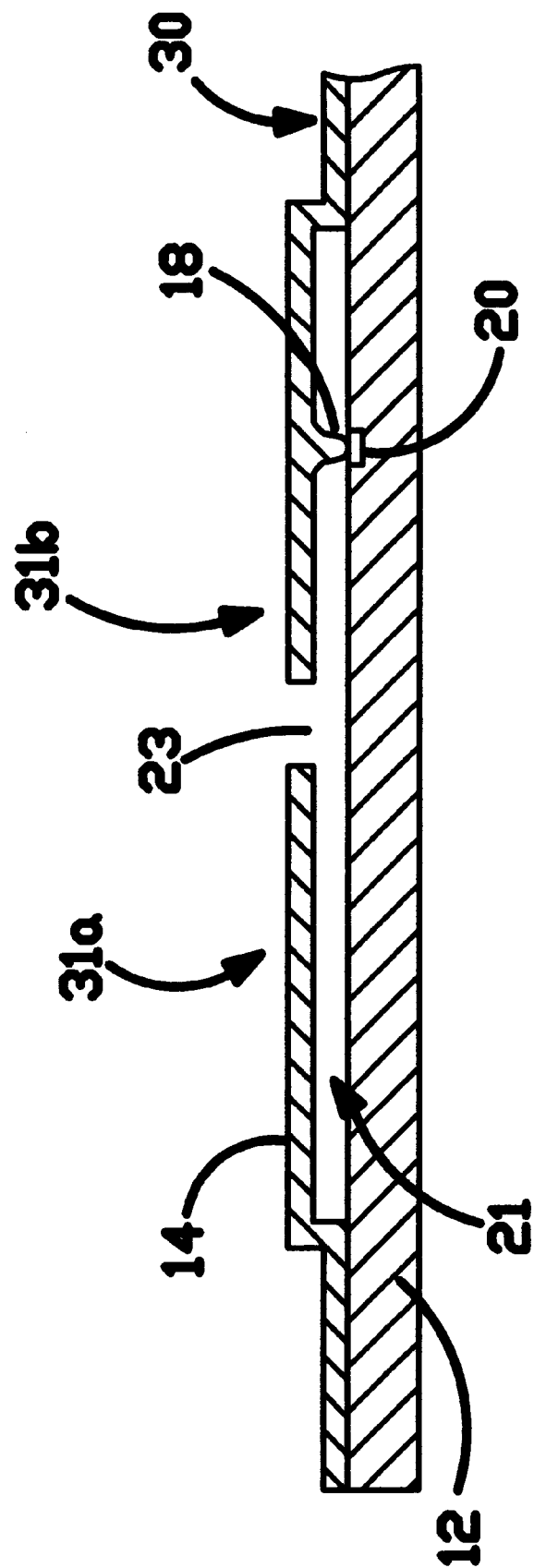
FIG. 6 is a sectional view along the line A—A in FIG. 5.

FIGS. 5 and 6 illustrate a membrane system 10 according to an alternative embodiment of the invention. Membrane system comprises substrate 12 covered by membrane 14. Membrane 14 is divided into areas 31 of various shapes and orientations by a combination of recessed regions 30 and slots 23. Areas 31 include an area 31a and another area 31b which are shown in cross-section in FIG. 6. Isolated areas 31 may comprise rectangles, truncated triangles and various irregular shapes. The arrangement illustrated in FIG. 5 is only an example and is not intended to be limiting. Many arrangements of areas 31 may be defined within membrane 14.

Figure 7:
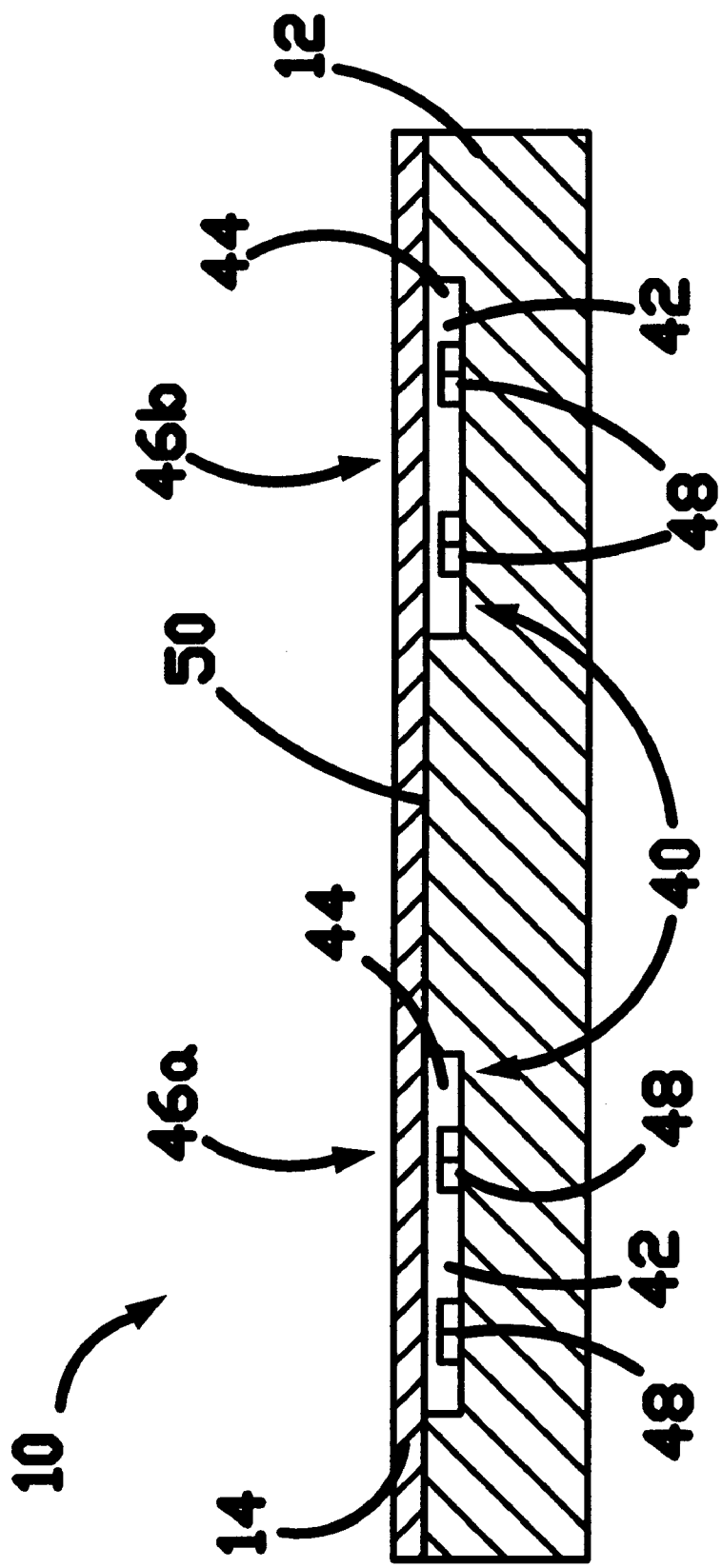
FIG. 7 is a sectional view of a membrane system according to a still further embodiment of the invention.

FIG. 7 shows a membrane system 10 according to a further embodiment of the invention. In the embodiment of FIG. 7, substrate 12 comprises a number of cells 40. Each cell 40 comprises an optical cavity 42 filled with a pressure-sensitive medium 44. Cells 40 are arranged to define isolated areas 46a and 46b of the overlying membrane 14. Pressure detecting means are provided in each area 46. The pressure detecting means may comprise a plurality of optical receiver/transmitter pairs 48 positioned in each cavity 42 underneath pressure-sensitive medium 44. Areas 46a and 46b are isolated from one another by isolating means. In the embodiment illustrated in FIG. 7, the isolating means comprises the portion 50 of membrane 14 attached to substrate 12 between cavities 42.

Any one of the membrane systems described above may be combined with a controller which derives information about the location and force applied to membrane 14 by one or more indentors from the signals generated by pressure sensors 20. The controller may provide outputs which identify the locations of one or more indentors in a suitable one-dimensional or two-dimensional coordinate system. The controller may also provide outputs which indicate the magnitude of the forces being applied at the locations of the indentor(s).

It is often desirable to know the location at which an indentor applies pressure to membrane system 10. Consider the case of an indentor applying a force upon membrane 14. In some prior art pressure sensors, the location of an indentor is determined by computing the "centre-of-mass" of the pressure signals. The process can be generalized to compute the locations of several indentors by a variety of different algorithms which determine a subset of pressure sensors corresponding to each indentor; a centre-of-mass or similar algorithm is then used on each subset to compute the location of the corresponding indentor. It is generally accepted that, for accurate centre-of-mass calculation, the sensors should be located in a regular rectangular array. That restriction is not necessary for this invention.

The pressure signal from a (properly calibrated) pressure sensor 20 depends on the force applied to membrane 14 and the distance from the centre of the indentor to the pressure sensor 20 as follows:

$$v_i = V(w, r_i) \tag{1}$$

where $v_i$ is the pressure signal of the $i^{th}$ sensor, w is the downward force applied by the indentor and $r_i$ is the distance from the indentor to the $i^{th}$ sensor. The inventors have determined that the function V can be represented as a product of two functions, one dependent only on w, and the other dependent on the distance between the indentor and the sensor as follows:

$$V(w, r_i) = V_w(w) V_{r,i}(r_i) \tag{2}$$

where $V_w$ is a function which depends only on the force applied and $V_{r,i}$ is a function which depends only on the distance. Pressure sensors 20 are preferably chosen such that the function $V_w(w)$ is the same for all sensors. The function $V_{r,i}(r_i)$ may be different for each sensor, depending on the physical features of membrane 14. To calibrate membrane system 10, one applies a number of known forces to a number of known locations on membrane 14 and measures $v_i$ from each pressure sensor 20 for each known force. Well known numerical methods are then used to determine $V_w(w)$ and $V_{r,i}(r_i)$.

The following examples relate to systems comprising a pressure-sensitive surface comprising an array of individual sensor elements, and a controller for receiving pressure information from the sensor elements. The controller is programmed to determine the location and optionally the amount of pressure applied by an indentor to the pressure-sensitive surface with a high degree of precision. The examples relate to various specific sensor arrays and controller functions.

EXAMPLE 1

Computing the Location of Applied Pressure

Consider a pressure-sensitive surface comprising a single straight row of sensors, onto which a membrane is applied. The coordinate x is used to specify the distance along an axis through the centers of the sensors from an arbitrary origin. In this example, the distance between the indentor and a sensor is simply $r_i = x - x_i$, where x is the location of the indentor and $x_i$ is the location of sensor i.

The problem is to determine the location x and the applied force w, for known set of $v_i$, and $x_i$, i=1, ..., N. One could compute the location x by the following formula:

$$x \approx \hat{x} = \frac{\sum_{i=1}^{N} x_i v_i}{\sum_{i=1}^{N} v_i} \quad (3)$$

where $\hat{x}$ is the estimated value of x. Equation (3) explicitly depends on the locations of the sensors, $x_i$, and implicitly depends on the physical parameters of the membrane. As a result, in general $x \neq \hat{x}$. Another way of stating this is that due to the shape of the function $V_{r,i}$, $\hat{x}$ may not be an accurate estimate of x.

This invention provides a method for accurately determining x. The following is the mathematical basis for this aspect of the invention. Substituting Equations (1) and (2) into Equation (3)

yields: (4)

$$\hat{x} = \frac{\sum_{i=1}^{N} x_i V_w(w) V_{r,i}(x - x_i)}{\sum_{i=1}^{N} V_w(w) V_{r,i}(x - x_i)} = \frac{\sum_{i=1}^{N} x_i V_{r,i}(x - x_i)}{\sum_{i=1}^{N} V_{r,i}(x - x_i)}$$

where $V_w(w)$ has been removed from the summation since it does not depend on i. As a result of Equation (2), the estimated location, $\hat{x}$, does not depend on the applied force. For convenience, we define the function h(x) as:

$$h(x) \equiv \frac{\sum_{i=1}^{N} x_i V_{r,i}(x - x_i)}{\sum_{i=1}^{N} V_{r,i}(x - x_i)} \quad (5)$$

One can define the inverse of h(x) to be the function H as follows:

$$H(h(x)) = x \quad (6)$$

H can be determined experimentally by acquiring pressure signals from sensors 20 as a known force is applied to membrane 14 at various positions along the x-direction. The acquired data may be used to compute $\hat{x}$ as a function of x. Inverting the functional dependence yields x as a function of $\hat{x}$, which is the function H.

One could also determine H numerically by applying Equations (5) and (6) using analytical expressions for the function $V_{r,i}$. Since H is independent of w, it is dependent only on the physical parameters and the geometry of membrane 14, so it needs to be determined only once. i.e. it can be determined in advance of use and called upon as required in an application. Having determined the function H, one can determine the location of an indentor by computing $\hat{x}$ by Equation (3) and then computing x as follows:

$$x = H(\hat{x}) \quad (7)$$

where x is the solution to the problem which was posed.

To summarize, one can compute x by application of the following algorithm:

determine the function H beforehand, by experimentation or analysis and store a representation of H;

during operation compute $\hat{x}$ from known $v_i$ and $x_i$, by Equation (3); and, during operation determine x by computing $x = H(\hat{x})$.

H may be stored as a function, a lookup table containing values at representative points of H, as a set of parameters which defines a function which approximates H—e.g. a set of polynomial coefficients, or the like.

To determine the magnitude of the applied force, one takes the sum of the pressure signals:

$$\sum_{i=1}^{N} v_i = \sum_{i=1}^{N} V_w(w) V_{r,i}(x - x_i) = V_w(w) \sum_{i=1}^{N} V_{r,i}(x - x_i) \quad (8)$$

This expression could be used as an estimate of the applied force, w. However, $\Sigma v_i$ is dependent on x. Thus the same applied force can result in different computed values of $\Sigma v_i$, depending on the location of the indentor. To facilitate computation of the applied force, w, we define the function:

$$W(w) \equiv \frac{V_w(w)}{V_w(w_0)} \quad (9)$$

where $w_0$ is a specified (constant) applied force. Rearranging this and substituting it into Equation (8), yields:

$$\sum_{i=1}^{N} v_i = W(w) V_w(w_0) \sum_{i=1}^{N} V_{r,i}(x - x_i) = W(w) \left[\sum_{i=1}^{N} v_i\right]_{w=w_0} \quad (10)$$

The function f(x) is defined as follows:

$$f(x) \equiv \left[\sum_{i=1}^{N} v_i\right]_{w=w_0} \quad (11)$$

which depends only on x, since the summation is evaluated at a known force $w_0$. Inherent in f(x) are the geometric and physical parameters of the membrane. In practice, f(x) can easily be determined by applying force $w_0$ to the membrane with an indentor at a number of positions x, and computing the sum of the sensor responses for each position of the indentor. The relationship between the position x and the sum of responses (for force $w_0$) is the function f(x).

Alternatively, if a mathematical model of the sensor response is known, then the function f(x) may be determined analytically or numerically. The function f(x) need only be determined once and may be called upon as required during operation. Having determined the function f(x), and having computed x previously, computation of the function W(w) follows by application of Equation (8) as follows:

$$W(w) = \frac{\sum_{i=1}^{N} v_i}{f(x)} \quad (12)$$

Importantly, W(w) does not depend on the coordinates of the indentor because of the assumption of Equation (2) and the definition of W(w). Even though the indentor position is used in the computation of f(x), and therefore in the computation of W(w), the division of $\Sigma v_i$ by f(x) exactly counteracts any positional dependency in $\Sigma v_i$.

In practice, knowing the value of W is generally sufficient since W is a single-valued monotonic function of w. However, in applications where it is important to know w exactly, then the function $V_w(w)$ of Equation (9) can be inserted and the inverted function used to compute w as follows:

$$w = V_w^{-1}(W(w)V_w(w_0)) \quad (13)$$

where $V_w^{-1}(W)$ is the inverse of $V_w(w)$.

EXAMPLE 2

Computation for an x-y-pad

Consider a two-dimensional pressure-sensitive surface whereupon we wish to compute the location of the indentor in two dimensions using a Cartesian coordinate system. The method described here can also be applied for other frames of reference. An indentor applies a downward force of magnitude w at coordinates (x,y). As before, we assume that the pressure response of the sensors satisfies Equation (2). In this case, however, the distance r is given by:

$$r_i = \sqrt{(x-x_i)^2 + (y-y_i)^2} \quad (14)$$

where $(x_i, y_i)$ are the coordinates of sensor i.

The location of the indentor could be computed as follows:

$$\hat{x} = \frac{\sum_i x_i v_i}{\sum_i v_i} \quad (15)$$

$$\hat{y} = \frac{\sum_i y_i v_i}{\sum_i v_i} \quad (16)$$

However, in general, $\hat{x}$ and $\hat{y}$ will not accurately determine x and y. In general, $\hat{x}$ will differ from x by an amount that depends on x and y.

This invention provides a method for accurately determining x and y. Substituting Equation (2) into Equation (15) and (16) and simplifying yields:

$$\hat{x} = \frac{\sum_i x_i V_{r,i}(r_i)}{\sum_i V_{r,i}(r_i)} \quad (17)$$

$$\hat{y} = \frac{\sum_i y_i V_{r,i}(r_i)}{\sum_i V_{r,i}(r_i)} \quad (18)$$

$V_w(w)$ is independent of i and can therefore be removed from the summation. Equations (17) and (18) show that, under the assumption of Equation (2), both $\hat{x}$ and $\hat{y}$ are independent of the applied force. The functions h(x,y) and g(x,y) are defined as follows:

$$\hat{x} = h(x, y) \equiv \frac{\sum_i x_i V_{r,i}(r_i)}{\sum_i V_{r,i}(r_i)} \quad (19)$$

$$\hat{y} = g(x, y) \equiv \frac{\sum_i y_i V_{r,i}(r_i)}{\sum_i V_{r,i}(r_i)} \quad (20)$$

The system of Equations (19) and (20) is then solved for (x,y) in terms of $(\hat{x},\hat{y})$. The functions H and G are defined as follows:

$$x = H(\hat{x},\hat{y})$$
$$y = G(\hat{x},\hat{y}) \quad (21)$$

As with Example 1, if an exact mathematical model of the pressure response is known, the functions H and G may be determined analytically or numerically. It is straightforward in practice to determine H and G experimentally. This can be done by applying a downward force to the membrane at a number of known positions (x,y), and computing $(\hat{x},\hat{y})$ for each of the known positions from the responses of the pressure sensors when the downward force is being applied at those known positions. The relationship between x and $(\hat{x},\hat{y})$ is H, and the relationship between y and $(\hat{x},\hat{y})$ is G. The relationships H and G need only be determined once for a given design of pressure sensing surface—they are dependent on the geometry and physical parameters of the membrane. Having determined the functions H and G, the coordinates of the indentor location can be determined during operation by computing $(\hat{x},\hat{y})$ in accordance with Equation (15) and (16) and then applying Equation (21).

It remains to compute the magnitude of the applied force. This follows a similar derivation as in Example 1. First define the parameter W(w) as in Equation (9). W(w) does not depend on the location (x,y) of the indentor. Rearranging Equation (9), yields $V_w(w)=W(w)V_w(w_0)$. Substituting this and Equation (2) into Equation (15) yields after simplification:

$$\sum_i v_i = W(w)\left[\sum_i v_i\right]_{w=w_0} \qquad (22)$$

which is identical to Equation (10). One then defines a new function:

$$f(x, y) \equiv \left[\sum_i v_i\right]_{w=w_0} \qquad (23)$$

f(x,y) is dependent only on the coordinates (x,y) of the indentor since the summation is evaluated at a known force $w_0$. Inherent in f(x,y) are the geometric and physical parameters of the membrane. In practice, f(x,y) can easily be determined by applying force $w_0$ to the membrane with an indentor at a number of known positions (x,y) and computing the sum of the sensor responses. The relationship between the position (x,y) and the sum of responses (for force $w_0$) is the function f(x,y). Alternatively, if a mathematical model of the sensor response, Equation (1) is known, then f(x,y) may be determined analytically or numerically. f(x,y) need only be determined once and may be called upon as required during operation. Having determined f(x,y), and having computed (x,y) previously, computation of the applied force follows by application of Equation (22) as follows:

$$W(w) = \frac{\sum_i v_i}{f(x, y)} \qquad (24)$$

In practice, knowing the value of W(w) is generally sufficient since it is a single-valued monotonic function of w. Importantly, W(w) does not depend on the location of the indentor (even though knowledge of those coordinates was used to compute f(x,y)). In essence, division by f(x,y) exactly counteracts the positional dependency of $$\sum_i v_i.$$

In applications where it is important to know w exactly, then the function W(w) can be inverted and the inverted function used to compute w. In order to do this, an analytic or numerical model for $V_w(w)$ is required, and then the definition of W(w), Equation (9), can be applied as follows:

$$w=V_w^{-1}(W(w)V_w(w_0)) \qquad (25)$$

where $V_w^{-1}(W)$ is the inverse of $V_w(w)$.

EXAMPLE 3

Special Case of an xy-pad with Row-column Sensor Arrangement

Consider the case where the pressure sensors have been arranged in a series of straight rows and straight columns. For convenience we chose the coordinate frame of reference, $F_{xy}$, to be oriented along the rows and columns. It is not necessary that the rows and columns be equally spaced, but it is stipulated that the pressure sensors are located at the every intersection of the imaginary straight lines which represent the rows and columns.

For this example, we introduce another assumption: the function $V_r(x,y)$ can be separated into the product of two functions as follows:

$$V_r(r)=V_x(\Delta x)V_y(\Delta y) \qquad (26)$$

where r is related to $\Delta x$ and $\Delta y$ by $r=\sqrt{\Delta x^2+\Delta y^2}$. Expanding Equation (2) with this assumption yields:

$$V(w;r)=V_w(w)V_x(\Delta x)V_y(\Delta y) \qquad (27)$$

In terms of an individual sensor response, this is written as $$v_i=V(w;r)=V_w(w)V_{x,i}(\Delta x_i)V_{y,i}(\Delta y_i) \qquad (28)$$

where $v_i$ is the pressure signal of sensor i located at coordinates $(x_i,y_i)$, w the downward force applied by an indentor at coordinates (x,y), and $(\Delta x_i, \Delta y_i)$ is the difference in coordinates between the sensor and the indentor: $\Delta x_i = x - x_i$, $\Delta y_i = y - y_i$. It can be verified by experimentation that touch sensitive surfaces fabricated in accordance with the foregoing do in fact satisfy Equation (28) to very close approximations.

Substituting Equation (28) into Equation (15) and simplifying yields:

$$\hat{x} = \frac{\sum_i x_i V_{x,i}(\Delta x_i)V_{y,i}(\Delta y_i)}{\sum_i V_{x,i}(\Delta x_i)V_{y,i}(\Delta y_i)} \qquad (29)$$

Since the sensors are arranged regularly, it follows that for each row of sensors, $y_i = y_j$, for sensors i, j in the same row. So $V_y(\Delta y_i)=V_y(\Delta y_j)$ for sensors in the same row. Then:

$$\hat{x} = \frac{\sum_{Row1} x_i V_{x,i}(\Delta x_i)V_{y,i}(\Delta y_i) + \sum_{Row2} x_i V_{x,i}(\Delta x_i)V_{y,i}(\Delta y_i) + \ldots + \sum_{RowM} x_i V_{x,i}(\Delta x_i)V_{y,i}(\Delta y_i)}{\sum_{Row1} V_{x,i}(\Delta x_i)V_{y,i}(\Delta y_i) + \sum_{Row2} V_{x,i}(\Delta x_i)V_{y,i}(\Delta y_i) + \ldots + \sum_{RowM} V_{x,i}(\Delta x_i)V_{y,i}(\Delta y_i)} \qquad (30)$$

$$= \frac{V_y|_{Row1}\sum_{Row1} x_i V_{x,i}(\Delta x_i) + \ldots + V_y|_{RowM}\sum_{RowM} x_i V_{x,i}(\Delta x_i)}{V_y|_{Row1}\sum_{Row1} V_{x,i}(\Delta x_i) + \ldots + V_y|_{RowM}\sum_{RowM} V_{x,i}(\Delta x_i)}$$

where $V_y|_{RowK}$ is the value of $V_y(\Delta y_i)$ for any sensor located in row K. Since the sensors are arranged regularly, it follows that $$\sum_{RowK} x_i V_{x,i}(\Delta x_i) = \sum_{RowL} x_i V_{x,i}(\Delta x_i) \text{ and } \sum_{RowK} V_{x,i}(\Delta x_i) = \sum_{RowL} V_{x,i}(\Delta x_i)$$

for all rows K, L. Therefore:

$$\hat{x} = \frac{\{V_y|_{Row1} + V_y|_{Row2} + \ldots + V_y|_{RowM}\}\left\{\sum_{Row1} x_i V_{x,i}(\Delta x_i)\right\}}{\{V_y|_{Row1} + V_y|_{Row2} + \ldots + V_y|_{RowM}\}\left\{\sum_{Row1} V_{x,i}(\Delta x_i)\right\}} \quad (31)$$

$$= \frac{\sum_{Row1} x_i V_{x,i}(\Delta x_i)}{\sum_{Row1} V_{x,i}(\Delta x_i)}$$

In a similar manner, one derives:

$$\hat{y} = \frac{\sum_{Column1} y_i V_{y,i}(\Delta y_i)}{\sum_{Column1} y_i V_{y,i}(\Delta y_i)} \quad (32)$$

Equations (31) and (32) show that under assumption (28), $\hat{x}$ is independent of the y-coordinate of the indentor and $\hat{y}$ is independent of the x-coordinate of the indentor. Both $\hat{x}$ and $\hat{y}$ are independent of the applied force. One thus writes:

$\hat{x} = h(x)$ $\hat{y} = g(y)$ where h(x) and g(x) are defined to be the right-hand sides of Equations (31) and (32) respectively. Let us assume that we can invert the functions h(x) and g(x). That is, define the functions H and G as follows:

$H(h(x)) = x$ $G(g(y)) = y$

As with the one-dimensional case of Example 1, it is straightforward in practice to determine H and G experimentally. Then, knowing H and G, one determines (x,y) by:

$x = H(\hat{x})$ $y = G(\hat{y})$ (34)

The system of equations (34) is much simpler that the corresponding system (21) for a general 2-dimensional surface. This example has shown that for pressure-sensitive surfaces constructed with straight rows and columns of sensors (even if they are not equally spaced), the computation of the location of the indentor is simplified by use of Equation (34) rather than Equation (21). Determination of the applied force follows in exactly the same manner as in the general case of Example 2.

The foregoing methods may be performed in a controller comprising a programmed data processor. The data processor could comprise, for example, one or more microprocessors. The one or more processors in the controller may implement the methods of the invention by executing software instructions in a program memory accessible to the one or more processors. Calibration information including a representation of H and, where appropriate, G may be stored in a data store in or otherwise accessible to the controller.

The invention has a wide range of possible applications including key pads for electronic equipment, controllers for electronic musical equipment, and the like.

The invention may also be provided in the form of a program product. The program product may comprise any medium which carries a set of computer-readable signals comprising instructions which, when executed by a computer processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, the novel methods for locating a position at which an indentor contacts a surface of a pressure-sensitive device described herein may be applied with types of pressure-sensitive structure other than those described in the preceding description. These methods may also be applied to locate points at which indentor(s) contact certain prior art pressure-sensitive devices. The methods for determining a magnitude of a force applied to an indentor may also be used with pressure-sensitive devices other than those described in the preceding description including certain prior art pressure-sensitive devices. Accordingly, the scope of the invention is to be construed in accordance with the substance defined by the following claims.

What is claimed is:

1. A position sensor comprising:
   a substrate;
   a membrane covering the substrate; and,
   pressure sensing means on the substrate;
   wherein the membrane has a stiffness which varies with position.

2. A position sensor as in claim 1 comprising means for isolating a first area of the membrane from a second, adjacent, area of the membrane such that a force applied to the first area causes substantially no response in a portion of the pressure sensing means underlying the second area.

3. A position sensor as in claim 2, wherein the means for isolating areas of the membrane comprises a slot located between the areas.

4. A position sensor as in claim 2, wherein the means for isolating areas of the membrane comprises a recessed region between the areas, the recessed region being fixedly engaged to the substrate with portions of the membrane displaced from the recessed region being not fixedly engaged to the substrate.

5. A position sensor as in claim 2, wherein the substrate comprises a plurality of cavities, and the means for isolating areas of the membrane comprises at least one portion of the membrane attached to the substrate between the cavities.

6. A position sensor as in claim 2, wherein the membrane is separated from the substrate except for at least one depressed region in contact with the substrate.

7. A position sensor as in claim 2, wherein the areas comprise one or more of a rectangular, triangular, truncated triangular or irregular-shaped area.

8. A position sensor as defined in claim 2, wherein the means for isolating areas of the membrane comprises a weakened portion of the membrane between the areas.

9. A position sensing device comprising a substrate having an array of pressure sensors and a signal processing means to receive pressure information from each of the pressure sensors, the signal processing means configured to determine a location of a force applied to the position sensor by:
- receiving a pressure signal from each individual pressure sensor;
- taking a weighted average of the pressure signals from the individual pressure sensors, the weighted average being a sum, over all of the individual pressure sensors, of a position of each individual pressure sensor in at least one dimension multiplied by the pressure signal from that individual pressure sensor, divided by a sum, over all of the individual pressure sensors, of the pressure signal from each individual pressure sensor; and
- applying a correction function to the weighted average to yield the location of the force applied to the membrane.

10. A computer implemented method of determining a location of an unknown force applied to a surface by an indentor, the surface comprising a plurality of pressure sensors covered by a membrane, wherein $(x_i, y_i)$ is a location of an $i^{th}$ one of the plurality of pressure sensors, the method comprising:
- measuring a pressure signal v from each of the plurality of pressure sensors;
- calculating $$\hat{x} = \frac{\sum_i x_i v_i}{\sum_i v_i} \text{ and } \hat{y} = \frac{\sum_i y_i v_i}{\sum_i v_i}$$

for the unknown force, wherein $v_i$ is the pressure signal from the $i^{th}$ pressure sensor;
- providing a function $H(\hat{x}, \hat{y})$ which represents a relationship between $\hat{x}, \hat{y}$ and x a function $G(\hat{x}, \hat{y})$ which represents a relationship between $\hat{x}, \hat{y}$ and y; and,
- calculating $x=H(\hat{x}, \hat{y})$ and $y=G(\hat{x}, \hat{y})$ for the unknown force.

11. The method of claim 10, wherein the providing step comprises applying a known force to the surface at a plurality of known locations $(x_{known}, y_{known})$ and calculating $$\hat{x} = \frac{\sum_i x_i v_i}{\sum_i v_i} \text{ and } \hat{y} = \frac{\sum_i y_i v_i}{\sum_i v_i}$$

for each known location, wherein $H(\hat{x}, \hat{y})=x_{known}$ for each $(\hat{x}, \hat{y})$ of each known location and $G(\hat{x}, \hat{y})=y_{known}$ for each $(\hat{x}, \hat{y})$ of each known location.

12. The method of claim 10 wherein the providing step comprises analytically determining $H(\hat{x}, \hat{y})$ and $G(\hat{x}, \hat{y})$ from known physical properties of the surface.

13. The method of claim 10 comprising determining a magnitude w of the unknown force by multiplying a sum of pressure signals $v_i$ from the plurality of pressure sensors by a function f(x,y) of the location of the unknown force.

14. The method of claim 13 wherein the function f(x,y) is a function determined by applying a known force to the surface at a plurality of known locations and taking a sum of pressure signals $v_i$ from the plurality of pressure sensors for each of the known locations.

15. A method of calculating a location of an unknown force applied to a surface by an indentor, the surface comprising a plurality of pressure sensors covered by a membrane, the method comprising:
- (a) measuring a pressure signal from each of the plurality of pressure sensors;
- (b) taking a weighted average of the pressure signals from the plurality of pressure sensors, the weighted average being a sum, over the plurality of pressure sensors, of a position of each pressure sensor in at least one dimension multiplied by the pressure signal from that pressure sensor, divided by a sum, over the plurality of pressure sensors, of the pressure signal from each pressure sensor;
- (c) correcting the weighted average of the pressure signals to determine the location of the unknown force applied to the surface, by applying a correction function to the weighted average.

16. The method of claim 15 wherein the correction function is determined by applying a known force to the surface a plurality of known locations and taking the weighted average of the pressure signals produced by the known force at each of the plurality of known locations, the correction function expressing the relationship between each known location the associated weighted average.

17. An apparatus comprising:
- a surface, the surface comprising a plurality of pressure sensors covered by a membrane;
- a processor coupled to receive a pressure signal from each of the plurality of pressure sensors, the processor programmed to determine a location of an unknown force applied to the surface by an indentor by:
  - measuring a pressure signal from each of the plurality of pressure sensors;
  - taking a weighted average of the pressure signals from the plurality of pressure sensors, the weighted average being a sum, over the plurality of pressure sensors, of a position of each pressure sensor in at least one dimension multiplied by the pressure signal from that pressure sensor, divided by a sum, over the plurality of pressure sensors, of the pressure signal from each pressure sensor; and,
  - correcting the weighted average of the pressure signals to determine the location of the unknown force applied to the surface, by applying a correction function to the weighted average.

* * * * *